US012596026B2

(12) United States Patent
Schleiferböck et al.

(10) Patent No.: US 12,596,026 B2
(45) Date of Patent: Apr. 7, 2026

(54) VIBRONIC SENSOR WITH REDUCED FACILITY FOR GAS BLASTING

(71) Applicant: Endress+Hauser SE+Co. KG, Maulburg (DE)

(72) Inventors: Jan Schleiferböck, Rümmingen (DE); Tobias Brengartner, Emmendingen (DE); Sergey Lopatin, Lörrach (DE); Julia Rosenheim, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 821 days.

(21) Appl. No.: 17/904,440

(22) PCT Filed: Jan. 28, 2021

(86) PCT No.: PCT/EP2021/051990
§ 371 (c)(1),
(2) Date: Aug. 17, 2022

(87) PCT Pub. No.: WO2021/165010
PCT Pub. Date: Aug. 26, 2021

(65) Prior Publication Data
US 2023/0070419 A1      Mar. 9, 2023

(30) Foreign Application Priority Data

Feb. 17, 2020    (DE) ..................... 10 2020 104 065.2

(51) Int. Cl.
G01F 23/296 (2022.01)
G01N 9/00 (2006.01)
G01N 11/16 (2006.01)
(52) U.S. Cl.
CPC ........... G01F 23/296 (2013.01); G01N 9/002 (2013.01); G01N 11/16 (2013.01); G01N 2009/006 (2013.01)

(58) Field of Classification Search
CPC .................. G01F 23/296; G01N 11/16; G01N 2009/006; G01N 9/002; G01N 29/022;
(Continued)

(56) References Cited

U.S. PATENT DOCUMENTS 4,703,652 A    11/1987  Itoh et al.
5,408,168 A     4/1995  Pfändler
(Continued)

FOREIGN PATENT DOCUMENTS

CN         103105215 A1    5/2013
CN         204330078 U1    5/2015
(Continued)

*Primary Examiner* — John E Breene
*Assistant Examiner* — Truong D Phan
(74) *Attorney, Agent, or Firm* — Kelly J. Smith; Endress+Hauser (USA) Holding, Inc.

(57) ABSTRACT

A device for determining and/or monitoring at least one process variable of a medium includes a mechanically vibratable unit, a drive/receiver unit and an electronic unit. The drive/receiver unit is designed to excite the mechanically vibratable unit to produce mechanical vibrations using an electrical excitation signal, and to receive the mechanical vibrations of the mechanically vibratable unit and convert them into an electrical reception signal. The electronics unit is designed to generate the excitation signal on the basis of the received signal, to set a frequency of the excitation signal in such a way that there is a predeterminable phase shift between the excitation signal and the received signal, and to determine the at least one process variable on the basis of the received signal, the mechanically vibratable unit comprising a diaphragm, and a surface of the diaphragm facing the process being curved.

5 Claims, 3 Drawing Sheets

(58) Field of Classification Search
    CPC ... G01N 2291/0427; G01N 2015/0011; G01N 2015/1026; G01N 2021/054; G01N 2035/1018; G01N 2291/02433
    USPC .................................. 73/291, 504.12–504.16
    See application file for complete search history.

(56) References Cited

U.S. PATENT DOCUMENTS

| | | | |
|---|---|---|---|
| 8,037,753 B2 | 10/2011 | Fehrenbach et al. | |
| 2014/0352427 A1* | 12/2014 | Dreyer .................. | G01F 23/296 73/290 V |
| 2015/0107363 A1 | 4/2015 | Takahashi et al. | |
| 2017/0343459 A1* | 11/2017 | Brengartner ........... | G01N 9/002 |
| 2020/0333255 A1* | 10/2020 | Reynolds ............. | G01N 21/274 |

FOREIGN PATENT DOCUMENTS

| | | | | |
|---|---|---|---|---|
| CN | 104819771 | A1 | 8/2015 | |
| CN | 109477751 | A1 | 3/2019 | |
| DE | 3149909 | A1 | 6/1983 | |
| DE | 3336991 | A1 | 5/1985 | |
| DE | 4429236 | A1 | 3/1996 | |
| DE | 10050299 | A1 | 4/2002 | |
| DE | 10057974 | A1 | 5/2002 | |
| DE | 102005015547 | A1 | 10/2006 | |
| DE | 102006033819 | A1 | 1/2008 | |
| DE | 102006034105 | A1 | 1/2008 | |
| DE | 102007013557 | A1 | 2/2008 | |
| DE | 102007043811 | A1 | 3/2009 | |
| DE | 202009005513 | U1 | 9/2010 | |
| DE | 102009026685 | A1 | 12/2010 | |
| DE | 102009028022 | A1 | 2/2011 | |
| DE | 102010030982 | A1 | 1/2012 | |
| DE | 102015102834 | A1 | 9/2016 | |
| DE | 102015122661 | A1 | 6/2017 | |
| DE | 102016112743 | A1 | 1/2018 | |
| DE | 102017112167 | A1 | 12/2018 | |
| DE | 102018111629 | A1 | 11/2019 | |
| EP | 0950879 | A1 | 10/1999 | |
| WO | 9221945 | A1 | 12/1992 | |
| WO | WO-2010040583 | A1 * | 4/2010 | ......... G01F 23/2967 |
| WO | 2020094266 | A1 | 5/2020 | |

* cited by examiner

VIBRONIC SENSOR WITH REDUCED FACILITY FOR GAS BLASTING

CROSS-REFERENCE TO RELATED APPLICATIONS

The present application is related to and claims the priority benefit of DPMA Patent Application No. 10 2020 104 065.2, filed on Feb. 17, 2020, and International Patent Application No. PCT/EP2021/051990, filed on Jan. 28, 2021, the entire contents of which are incorporated herein by reference.

TECHNICAL FIELD

The invention relates to a device for determining and/or monitoring at least one process variable of a medium, comprising a mechanically vibratable unit, a drive/receiver unit, and an electronics unit. The medium is thereby located in a container, e.g., in a reservoir or in a pipeline. The process variable in turn is, for example, an, especially predeterminable, fill level, flow rate, the density, or the viscosity of the medium.

BACKGROUND

Vibronic sensors are often used in process and/or automation engineering. In the event of fill level measuring devices, they have at least one mechanically vibratable unit such as, for example, a vibrating fork, a single rod, or a diaphragm. In operation, this is excited to produce mechanical vibrations by means of a drive/receiver unit, often in the form of an electromechanical transducer unit, which in turn can be a piezoelectric drive or an electromagnetic drive, for example. A wide variety of corresponding field devices are produced by the applicant and are distributed under the name LIQUIPHANT or SOLIPHANT, for example. The underlying measurement principles are known in principle from numerous publications. The drive/receiver unit excites the mechanically vibratable unit to produce mechanical vibrations by means of an electrical excitation signal. Conversely, the drive/receiver unit can receive the mechanical vibrations of the mechanically vibratable unit and convert them into an electrical reception signal. The drive/receiver unit is accordingly either a separate drive unit and a separate receiver unit or a combination drive/receiver unit.

In many instances, the drive/receiver unit is thereby part of an electrical resonant feedback circuit by means of which the excitation of the mechanically vibratable unit to produce mechanical vibrations takes place. For example, the resonant circuit condition according to which the amplification factor is $\geq 1$ and all phases occurring in the resonant circuit result in a multiple of 360° must be fulfilled for a resonant vibration. To excite and fulfill the resonant circuit condition, a defined phase shift must be ensured between the excitation signal and the reception signal. A predeterminable value for the phase shift, thus a setpoint for the phase shift between the excitation signal and the reception signal, is therefore often set. For this purpose, various solutions, both analog and digital methods, have become known from the prior art, as described, for example, in documents DE102006034105A1, DE102007013557A1, DE102005015547A1, DE102009-026685A1, DE102009028022A1, DE102010030982A1, or DE00102010030982A1.

Both the excitation signal and the reception signal are characterized by their frequency $\omega$, amplitude A, and/or phase $\phi$. Accordingly, changes in these variables are usually used to determine the respective process variable. The process variable can, for example, be a fill level, a specified fill level, or the density or the viscosity of the medium, and also the flow rate. Given a vibronic level switch for liquids, for example, a distinction is made between whether the vibratable unit is covered by the liquid or vibrates freely. These two conditions, the free condition and the covered condition, are differentiated, for example, on the basis of different resonant frequencies, i.e. on the basis of a frequency shift.

The density and/or viscosity can in turn only be determined with such a measuring device if the vibratable unit is completely covered by the medium. In connection with the determination of the density and/or viscosity, different possibilities have likewise become known from the prior art, such as those disclosed in documents DE10050299A1, DE102007043811A1, DE10057974A1, DE102006-033819A1, DE102015102834A1, or DE102016112743A1.

One problem with sensors based on mechanical vibrations relates to the presence of gas bubbles in different media. Gas bubbles have a large influence on the viscoelastic properties of liquids. Accordingly, unintentional changes in the vibration frequency of the vibratable unit, which are not related to the respective process variable under consideration, can occur, concomitant with falsified measured values for the respective process variable.

A wide variety of factors, such as a stirring or pumping operation in the process, an outgassing of dissolved air after a pressure reduction in the medium, or even a change in the media temperature, can be responsible for the formation of gas bubbles in liquid media.

Gas bubbles are especially commonly formed in fresh water or aqueous solutions. Separated gas bubbles thereby play a role, both distributed in the medium and thus also on a surface of the respective sensor unit of the sensor which comprises the vibratable unit.

For example, a method for determining a physical parameter of a gas-charged liquid by means of a Coriolis flow rate meter has become known from DE102015122661A1. The vibratable unit is excited in two different vibration modes to produce mechanical vibrations which depend to different degrees on gas bubbles that are present within the medium. The influence of the gas bubbles on the measurement can be determined and corrected from the ratio of the values calculated for the density and/or the mass flow rate in the two vibration modes.

SUMMARY

However, it would be desirable to be able to, from the outset, avoid the adhesion of gas bubbles and the measurement inaccuracies caused thereby. Thus, starting from the cited prior art, the present invention is based on the object of improving the measurement accuracy of a vibronic sensor.

This object is achieved by the device for determining and/or monitoring at least one process variable of a medium comprising a mechanically vibratable unit, a drive/receiver unit, and an electronics unit according to claim 1. The drive/receiver unit is designed to excite the mechanically vibratable unit to produce mechanical vibrations by means of an electrical excitation signal, and to receive the mechanical vibrations of the mechanically vibratable unit and convert them into an electrical reception signal. The electronics unit is in turn designed to generate the excitation signal on the basis of the reception signal, to set a frequency of the excitation signal in such a manner that there is a predeterminable phase shift between the excitation signal and reception signal, and to determine the at least one process variable using the reception signal. According to the invention, the mechanically vibratable unit comprises a diaphragm, wherein a surface of the diaphragm facing toward the process is curved.

The vibratable unit is part of a sensor unit of the device. For example, this is a diaphragm vibrator, a single rod, or a vibrating fork, given which the vibratable unit comprises the diaphragm and/or one or more vibrating elements that are integrally formed on the diaphragm. The drive/receiver unit can comprise at least one piezoelectric element, but it can also be an electromagnetic drive/receiver unit. On the one hand, it serves as a drive/receiver unit for generating the mechanical vibrations of the mechanically vibratable unit by means of an electrical excitation signal which can be, for example, a sinusoidal or rectangular-wave signal. However, it also serves to receive the mechanical vibrations and convert the vibrations into an electrical reception signal. In the event that the vibratable unit is covered by medium, the mechanical vibrations of the mechanically vibratable unit are influenced by the properties of the medium, so that a conclusion about the at least one process variable can be generated using the reception signal representing the vibrations of the vibratable unit. The mechanically vibratable unit is preferably excited at least temporarily to produce resonant vibrations.

A deposition and/or an adhesion of gas bubbles in the region of the diaphragm can be markedly reduced by the curved design of the diaphragm. In contrast, in the event of planar surfaces, a deposition of gas bubbles preferably takes place in the region of the diaphragm, which bubbles—due to the Archimedean principle—remain there and cannot escape. By contrast, given a curved surface, the gas bubbles are moved outwards from a central region of the surface due to the buoyancy force and can escape from there.

Numerous variants are conceivable for the specific design of the curved diaphragm, all of which fall under the present invention. The exact shape and nature of the diaphragm can thereby be suitably selected depending on the application, for example depending on the installation position of the sensor, or the medium. Some preferred embodiments for a diaphragm according to the invention are specified by way of example below.

In one embodiment of the invention, the surface of the diaphragm is thus convex at least in sections. This is advantageous especially if the device is attached to the container by an upper or lateral wall of the container.

In an alternative embodiment of the invention, the surface of the diaphragm is concave at least in sections. Such an embodiment is in turn advantageous given an integration of the device from a lower wall of the container.

In a further embodiment, the surface is designed to be conical, frusto-conical, hemispherical, or in the form of a spherical segment.

Yet another embodiment includes that the surface is rounded, in particular in the region of a center point of the surface.

An alternative embodiment includes that the surface has a tip, in particular in the region of a center point of the surface. A surface with tip can especially accelerate a separation process of gas bubbles located on the surface of the diaphragm.

In a further embodiment, the surface is designed to be symmetrical with respect to the center point of the surface.

A symmetrical embodiment is advantageous with respect to the vibration properties of the vibratable unit.

It is advantageous if at least one vibrating element is integrally formed on the diaphragm. It is likewise advantageous if at least two vibrating elements are integrally formed on the diaphragm. Therefore, this is preferably a single rod or a vibrating fork. However, more than two vibrating elements can also be integrally formed on the diaphragm.

In this regard, it is advantageous if a transition region between the diaphragm and the vibrating element has a respective predeterminable transition radius. In this manner, an adhesion of gas bubbles in the transition region can be markedly reduced or avoided.

Yet another embodiment includes that an angle between a plane parallel to a longitudinal axis through the diaphragm and a tangent to the surface of the diaphragm is less than or equal to 45°. Such an embodiment is especially reasonable if the device is a vibronic multisensor, for example as is described in the previously unpublished international patent application with file number PCT/EP2019/064724, or in the previously unpublished German patent application with reference number 102018127526.9. Reference is made to these applications in their entirety below.

In a further embodiment, the device comprises at least one first piezoelectric element which serves as a drive/receiver unit, wherein the device is designed to excite the mechanically vibratable unit to produce mechanical vibrations by means of an excitation signal, to receive mechanical vibrations of the vibratable unit and convert them into a first reception signal, to emit a transmission signal, and to receive a second reception signal, and wherein the electronics are designed to determine the at least one process variable of the medium using the first and/or second reception signal.

The transmission signal is preferably an ultrasound signal, especially a pulsed ultrasound signal, especially at least one ultrasound pulse. An ultrasound-based measurement is accordingly performed within the scope of the present invention as the second measurement method that is used. The respective emitted transmission signal at least partially passes through the medium and is influenced by the latter in terms of its properties. Accordingly, conclusions about different media can likewise be drawn using the respectively received second reception signal.

It is advantageous if the device further comprises at least one second piezoelectric element, wherein the first and second piezoelectric elements are designed to excite the mechanically vibratable unit to produce mechanical vibrations by means of an excitation signal, and to receive the mechanical vibrations of the vibratable unit and convert them into a first reception signal, wherein the first piezoelectric element is designed to emit a transmission signal, and wherein the second piezoelectric element is designed to receive the transmission signal in the form of a second reception signal.

These embodiments consequently involve such a multisensor in which two different measuring principles are combined.

It is likewise advantageous if the mechanically vibratable unit is a vibrating fork with a first and a second vibrating element, and wherein the first piezoelectric element is at least partially arranged in the first vibrating element and the second piezoelectric element is at least partially arranged in the second vibrating element. Corresponding embodiments of a sensor unit have been described, for example in the documents DE102012100728A1 and DE102017130527A1. Both applications are likewise referred to in their entirety within the scope of the present invention. The possible embodiments of the sensor unit described in the two documents are exemplary possible structural embodiments of the sensor unit. For example, it is also not absolutely necessary to arrange the piezoelectric elements exclusively in the region of the vibrating elements. Rather, individual piezoelectric elements of those used may also be arranged in the region of the diaphragm, or in further vibrating elements which are not used for the vibronic excitation and which are likewise applied to the diaphragm.

BRIEF DESCRIPTION OF THE DRAWINGS

Finally, it is advantageous if an extent of the diaphragm parallel to a longitudinal axis of the vibrating elements is less than 20% of a length of the vibration rods parallel to the longitudinal axis.

The invention is explained in greater detail with reference to the following Figures. The following is shown:

DETAILED DESCRIPTION

Figure 1:
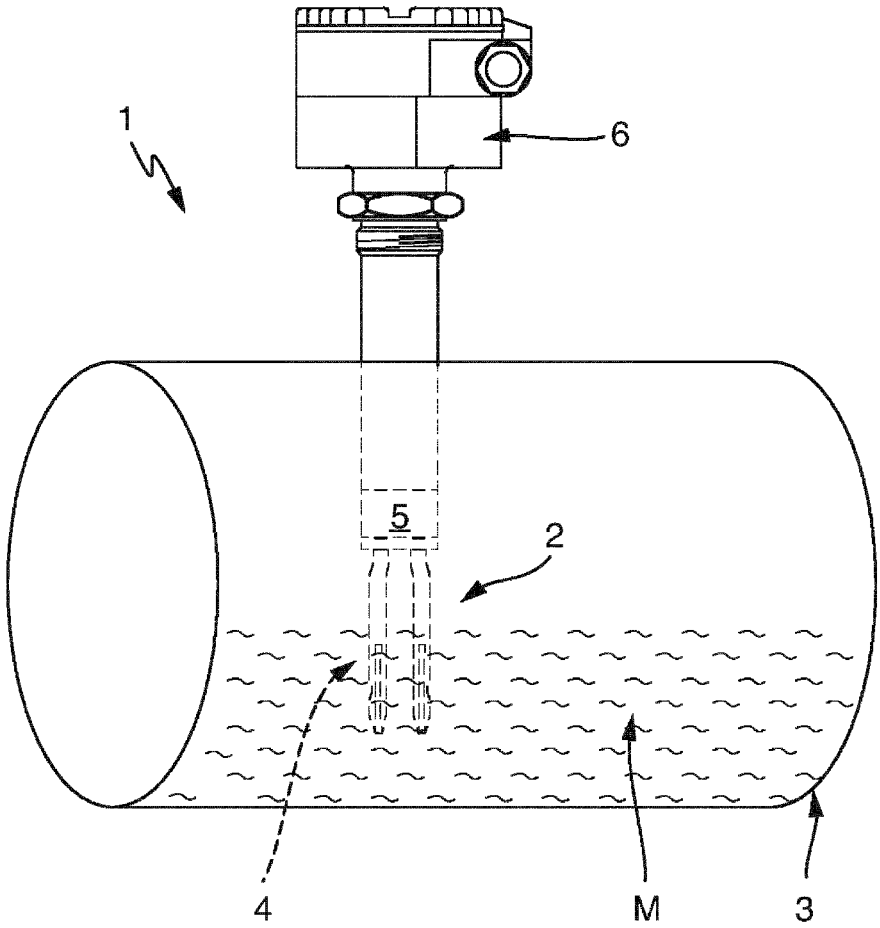

FIG. 1 shows a schematic drawing of a vibronic sensor according to the prior art;

FIG. 2 shows a vibratable unit in the form of a vibrating fork with a (a) planar and (b) curved surface of the diaphragm; and FIG. 3 shows various exemplary embodiments for a curved diaphragm.

In the Figures, identical elements are respectively provided with the same reference signs. FIG. 1 shows a vibronic sensor 1 having a sensor unit 2. The sensor has a mechanically vibratable unit 4, in the form of a vibrating fork, which is partially dipped into a medium M which is located in a reservoir 3. The vibratable unit 4 is excited by the drive/receiver unit 5 to produce mechanical vibrations and, for example, can be a piezoelectric stack drive or bimorphic drive. Other vibronic sensors have electromagnetic drive/receiver units 5, for example. It is possible to use a single drive/receiver unit 5 which serves both to excite the mechanical vibrations and to detect them. However, it is likewise conceivable to realize one each, a drive unit and a receiver unit. Furthermore depicted in FIG. 1 is an electronics unit 6 by means of which the signal acquisition, evaluation, and/or feed takes place.

Figure 2A:
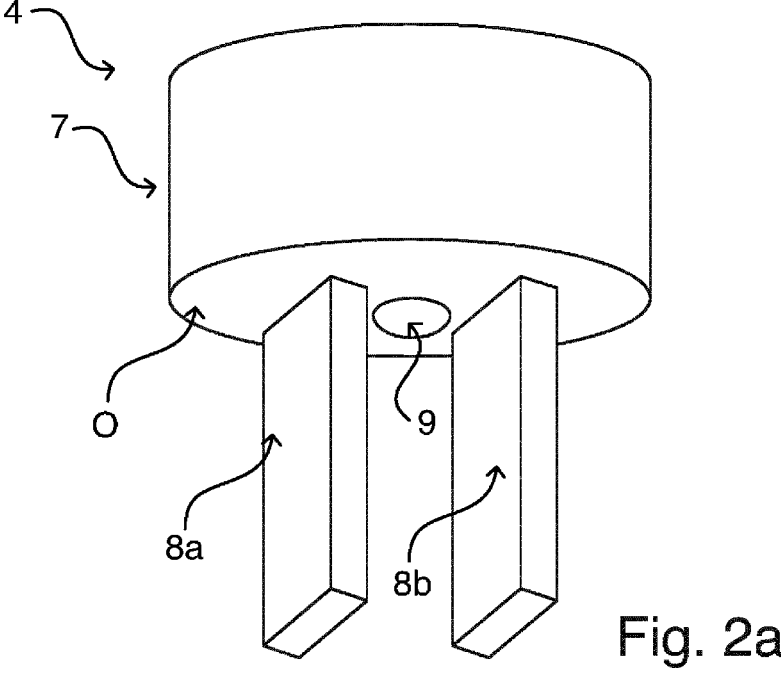

Depicted in FIG. 2 is a respective vibratable unit 4 in the form of a vibrating fork. The unit 4 has a diaphragm 7, on whose surface O, which in the state as introduced into the container 3 is the medium M, are integrally formed two vibrating elements 8a, 8b. In FIG. 2a, the surface O of the diaphragm 7 is designed to be planar. As a result, gas bubbles contained in the medium M can accumulate on the surface O of the diaphragm 7 and are trapped there according to the Archimedean principle.

Figure 2B:
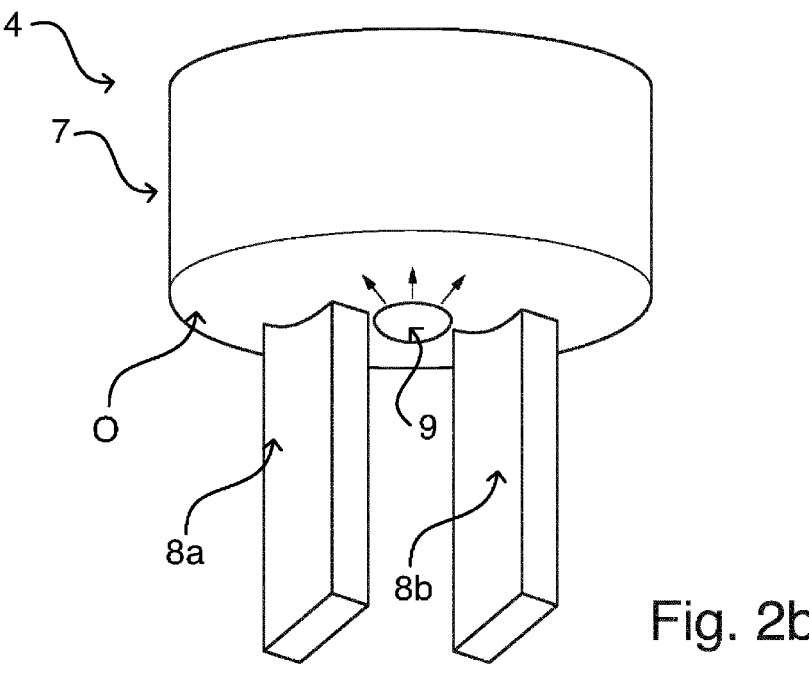

In the variant according to the invention as depicted in FIG. 2b, the surface O of the diaphragm 7 is, by contrast, curved so that gas bubbles pass from the center of the surface O to its edge and can escape from there. Thus, a curved design significantly reduces the sensitivity of a vibronic sensor with respect to the adhesion of gas bubbles, and the associated disadvantageous measuring effects.

Figures 3A, 3B, 3C, 3D:
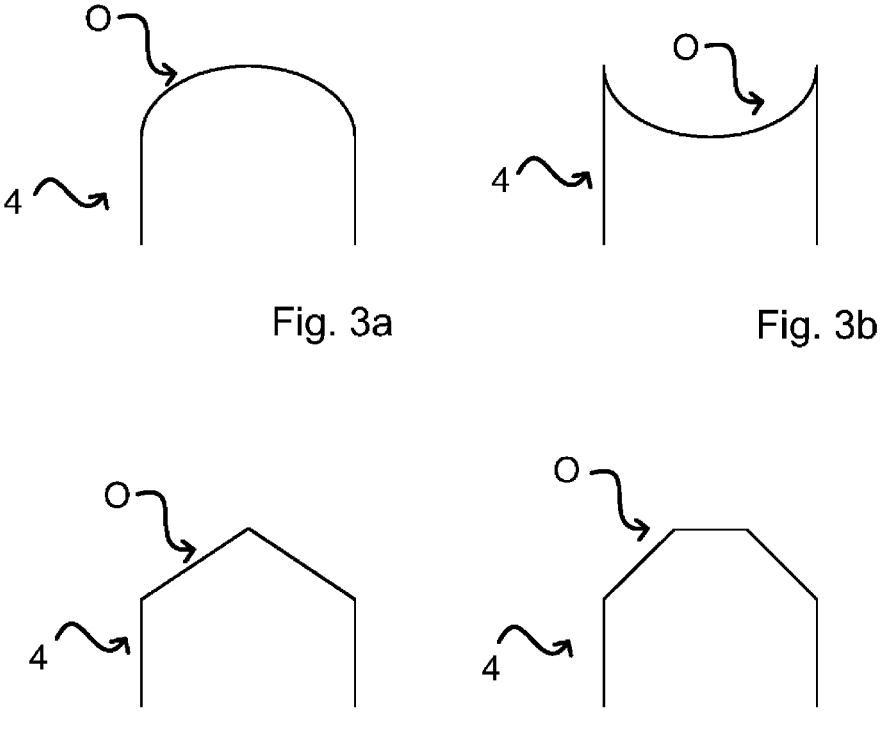

Numerous embodiments are conceivable for a diaphragm according to the invention, some of which are depicted by way of example in FIG. 3, respectively in the form of a sectional drawing. For example, the surface O can be designed to be convex, as shown in FIG. 3a, or concave, as shown in FIG. 3b, especially depending on the installation position of the sensor 1. In both instances, the surface O is rounded. Alternatively, the surface O can also have the shape of a hemisphere or of a spherical segment. Moreover, as depicted in FIG. 3c, a surface O with a tip or, for example, in the form of a truncated cone as illustrated in FIG. 3d is also conceivable. In addition to the embodiments shown here, numerous further possibilities are also conceivable, all of which fall under the present invention. It is also noted that the surface O does not necessarily need to be designed to be symmetrical, as is so for the variants depicted in FIG. 3. Rather, the surface O can be selected specific to the application.

The invention claimed is:

1. A device for determining or monitoring at least one process variable of a medium, comprising:
   a mechanically vibratable unit, a drive/receiver unit, and an electronics unit;
   wherein at least a first piezoelectric element and a second piezoelectric element serve as the drive/receiver unit;
   wherein the mechanically vibratable unit is a vibrating fork including a diaphragm, a first vibrating element and a second vibrating element;
   wherein the first vibrating element and the second vibrating element are integrally formed on the diaphragm;
   wherein the first piezoelectric element is at least partially arranged in the first vibrating element and the second piezoelectric element is at least partially arranged in the second vibrating element;
   wherein the drive/receiver unit is designed to excite the mechanically vibratable unit to produce mechanical vibrations by means of an electrical excitation signal, and to receive the mechanical vibrations of the mechanically vibratable unit and convert them into a first reception signal;
   wherein the first piezoelectric element is designed to emit an ultrasonic transmission signal;
   wherein the second piezoelectric element is designed to receive the ultrasonic transmission signal in the form of a second reception signal;
   wherein the electronics unit is designed to generate the excitation signal on the basis of the first reception signal, to set a frequency of the excitation signal in such a way that there is a predeterminable phase shift between the excitation signal and the first reception signal, and to determine the at least one process variable using the first reception signal and/or the second reception signal; and
   wherein a surface of the diaphragm facing toward the process is curved by being concave.

2. The device according to claim 1, wherein the surface of the diaphragm facing toward the process is rounded in a region of a center point of the surface.

3. The device according to claim 1, wherein the surface of the diaphragm facing toward the process has a tip in a region of a center point of the surface.

4. The device according to claim 1, wherein the surface of the diaphragm facing toward the process is designed to be symmetrical with respect to a center point of the surface.

5. The device according to claim 1, wherein an angle between a plane parallel to a longitudinal axis through the diaphragm and a tangent to the surface of the diaphragm is less than or equal to 45°.

* * * * *